(12) United States Patent
Ikuno

(10) Patent No.: US 8,888,415 B2
(45) Date of Patent: Nov. 18, 2014

(54) ANCHOR AND METHOD OF INSTALLING ANCHOR

(71) Applicant: N-Pat Co., Ltd., Kaigandori, Minato-ku, Osaka (JP)

(72) Inventor: Makoto Ikuno, Osaka (JP)

(73) Assignee: N-Pat Co., Ltd., Kaigandori, Minato-Ku, Osaka (JP)

( * ) Notice: Subject to any disclaimer, the term of this patent is extended or adjusted under 35 U.S.C. 154(b) by 0 days.

(21) Appl. No.: 13/757,403

(22) Filed: Feb. 1, 2013

(65) Prior Publication Data

US 2013/0202364 A1    Aug. 8, 2013

(30) Foreign Application Priority Data

Feb. 2, 2012  (JP) ................. 2012-020474
Nov. 26, 2012 (JP) ................. 2012-257321

(51) Int. Cl.
*E21D 21/02* (2006.01)
*E21D 21/00* (2006.01)
*F16B 31/02* (2006.01)
*F16B 13/06* (2006.01)

(52) U.S. Cl.
CPC ............ *E21D 21/008* (2013.01); *F16B 31/021* (2013.01); *F16B 13/066* (2013.01)
USPC .................. 405/259.2; 405/259.4

(58) Field of Classification Search
CPC . E21D 21/00; E21D 21/0026; E21D 21/0033; E21D 21/004; E21D 21/0046; E21D 21/008; E21D 31/021
USPC .............................. 405/259.1–262
See application file for complete search history.

(56) References Cited

U.S. PATENT DOCUMENTS 2,747,454 A * 5/1956 Bowersett ............... 411/8
4,413,930 A * 11/1983 Calandra, Jr. .......... 405/259.6

(Continued)

FOREIGN PATENT DOCUMENTS

DE  25 47 634 A1  4/1977
DE  26 58 996 A1  6/1978

(Continued)

OTHER PUBLICATIONS

The extended Search Report dated Apr. 29, 2013, issued in corresponding European Patent Application No. 13153643.5. (9 pages).

(Continued)

*Primary Examiner* — Benjamin Fiorello
(74) *Attorney, Agent, or Firm* — Buchanan Ingersoll & Rooney

(57) ABSTRACT

An anchor comprises an anchor bolt having a shaft and a bolt head, a spreading sleeve having spreading parts provided at a tip portion of a tubular body capable of being fitted on a tip portion of the shaft and a cone nut provided at its inner side a screw through hole to threadedly engage with the shaft. The shaft of the anchor bolt is composed of a thick shaft part connected to the bolt head, and a thin shaft part provided to be closer to the tip portion of the shaft. The thick shaft part is provided with a rupture portion reduced in diameter. The rupture portion is provided at a position spaced by a predetermined length from the step between the thick shaft part and the thin shaft part and ruptures if torque of a predetermined value acts on the bolt head.

11 Claims, 9 Drawing Sheets

(56) References Cited

U.S. PATENT DOCUMENTS

| | | | |
|---|---|---|---|
| 4,772,166 A * | 9/1988 | Shamah et al. | 411/32 |
| 4,904,135 A | 2/1990 | Barthomeuf et al. | |
| 4,969,778 A * | 11/1990 | Calandra, Jr. et al. | 405/259.6 |
| 5,244,314 A * | 9/1993 | Calandra, Jr. et al. | 405/259.4 |
| 5,746,556 A | 5/1998 | Sato | |
| 5,993,129 A | 11/1999 | Sato | |
| 6,056,471 A | 5/2000 | Dinitz | |
| 6,224,596 B1 | 5/2001 | Jackson | |
| 6,261,039 B1 | 7/2001 | Reed | |
| 7,357,613 B2 | 4/2008 | Houck et al. | |
| 2004/0191004 A1* | 9/2004 | Cook | 405/288 |
| 2005/0123375 A1* | 6/2005 | Ramasamy | 411/88 |
| 2010/0278593 A1* | 11/2010 | Cook | 405/259.3 |
| 2012/0201625 A1 | 8/2012 | Ikuno | |

FOREIGN PATENT DOCUMENTS

| | | |
|---|---|---|
| EP | 0 332 496 A1 | 9/1989 |
| EP | 0 470 470 A2 | 2/1992 |
| EP | 2 112 383 A2 | 10/2009 |
| EP | 2 484 922 A2 | 8/2012 |
| GB | 1 517 657 A | 7/1978 |
| JP | 9-071934 | 3/1997 |
| JP | 10-110475 A | 4/1998 |
| JP | 10-231583 A | 9/1998 |
| JP | 2002-070178 A | 3/2002 |
| JP | 2006-219908 | 8/2006 |
| JP | 2008-185076 | 8/2008 |
| JP | 2009-138341 | 6/2009 |
| JP | 2011-111715 A | 6/2011 |
| WO | 2006/034208 A1 | 3/2006 |
| WO | 2011/137955 A1 | 11/2011 |

OTHER PUBLICATIONS

Official Action issued in corresponding U.S. Appl. No. 13/363,992, dated Feb. 3, 2014.

U.S. Office Action issued Jun. 17, 2014 in U.S. Appl. No. 13/363,992 (8 pages).

* cited by examiner

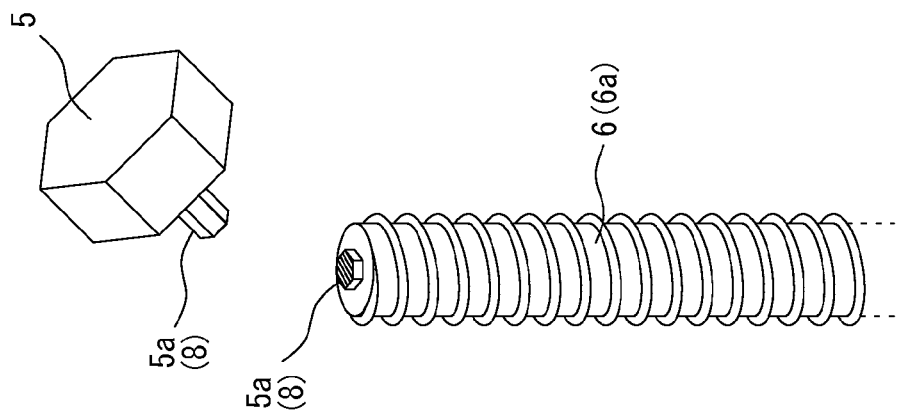
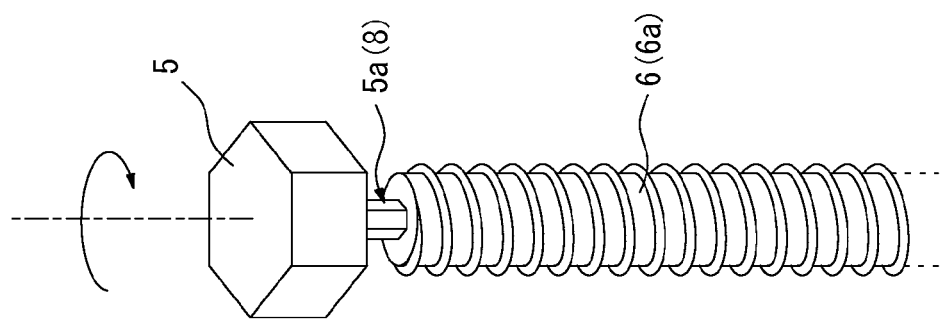
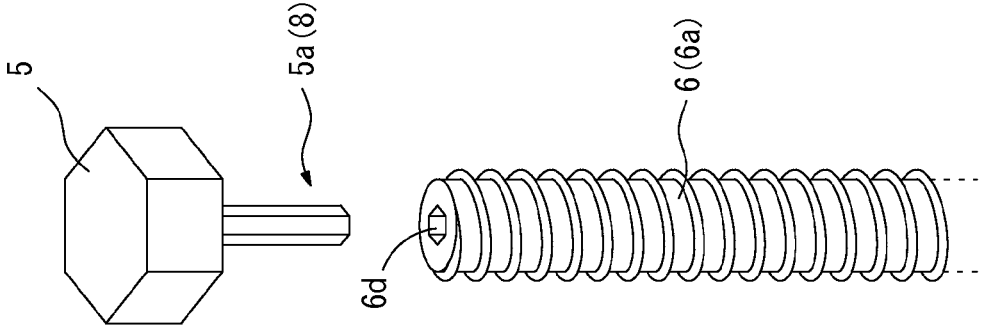

ANCHOR AND METHOD OF INSTALLING ANCHOR

This application is based on the applications Nos. 2012-020474 and 2012-257321 filed in Japan, the contents of which are hereby incorporated by reference.

BACKGROUND OF THE INVENTION

1. Field of the Invention

The present invention relates to an anchor to be attached to various types of skeletons such as concrete buildings and structures, and a method of installing the anchor.

2. Background Art

In order to attach hanging objects such as air conditioners, lighting fixtures, and various types of pipes to an existing ceiling structure of a concrete building, for example, anchors to support the hanging objects are fixed to the ceiling structure. These anchors may be fixed not only to a ceiling structure but also to a wall surface or a floor. Conventionally known anchors of this type are disclosed for example in Japanese Patent Applications Laid-Open Nos. 10-231583 (1998) (patent literature 1) and 10-110475 (1998) (patent literature 2).

Referring for example to the anchor disclosed in patent literature 1, it includes a spreading sleeve, and a cone nut in the form of a truncated cone. The spreading sleeve is to be swaged to be integrated with a tip portion of a steel bar, and in which multiple slits extending in the axial direction from the tip of the spreading sleeve are provided. The cone nut has a smaller-diameter edge part press-fitted into a tip portion of the spreading sleeve. Regarding installation of this anchor, with the cone nut facing a hole in concrete, the anchor is inserted into the hole. Then, with the tip of the cone nut in abutting contact with the bottom of the hole, the steel bar is struck for example with a hammer to drive the anchor into the hole. This strike presses the cone nut into the spreading sleeve. In response to this press-fit, the tip portion of the spreading sleeve spreads outwardly and radially along a tapered surface of the cone nut to press the inner wall of the hole, thereby fixing the anchor to a skeleton.

Referring to the anchor disclosed in patent literature 2, it includes an anchor socket fixedly pressed-fitted into a hole in concrete, and an anchor bolt threaded into the anchor socket through an opening at one end portion of the anchor socket. A slit is formed in an opposite end portion of the anchor socket. A head is integrally provided at a tip portion of a shaft of the anchor bolt. The head is press-fitted into the inner circumference of the opposite end portion of the anchor socket to make the opposite end portion spread. Regarding installation of this anchor, with the opposite end portion of the anchor socket facing a hole in concrete, the anchor socket is inserted in advance into the hole. In this condition, the anchor bolt is threadedly inserted into the anchor socket through the opening at one end portion of the anchor socket. In response to the threaded insertion of the anchor bolt, the head at the tip portion of the anchor bolt makes the opposite end portion of the anchor socket spread, thereby fixing the anchor to a skeleton.

SUMMARY OF THE INVENTION

The anchor of patent literature 1 is not suited for fixation to a ceiling structure. The reason therefor is that, in the anchor of patent literature 1, the steel bar suspended from the ceiling structure and the cone nut press-fitted into the tip portion of the spreading sleeve are structurally separated. So, if the ceiling structure is shaken strongly for example by an earthquake, the cone nut falls off the inside of the spreading sleeve, resulting in drop of the spreading sleeve integrated with the tip portion of the steel bar from the ceiling structure.

Further, for installation of the anchor of patent literature 1, the cone nut is press fitted into the spreading sleeve by striking a steel bar for example with a hammer. This generates another problem in that it is difficult to determine during installation or after the installation if the anchor is fixed to a skeleton with sufficient strength.

Meanwhile, in the anchor of patent literature 2, as the head to make the anchor socket spread is provided integrally with the anchor bolt, there is no fear of drop of the anchor bolt. Thus, unlike the anchor of patent literature 1, the anchor of patent literature 2 does not suffer from drop of the anchor from a ceiling structure so that it can be attached even to the ceiling structure.

However, installation of the anchor of patent literature 2 involves the process as follows. First, the anchor socket is pressed into the hole in concrete by striking the anchor socket with a hammer, for example. After the anchor socket is inserted into the hole, the anchor bolt is screwed into the anchor socket through the opening at one end portion of the anchor socket with a tool such as a spanner. To be specific, the installation of the anchor of patent literature 2 involves two operations including operation of striking for example with a hammer and operation of screwing the anchor bolt with a tool such as a spanner. Hence, some sort of problem may be generated if the operations are not performed efficiently.

The anchor of patent literature 2 also generates the problem in that it is difficult to determine during installation of the anchor or after the installation if the anchor is fixed to a skeleton with sufficient strength. In particular, in the case of installation on a ceiling structure, it becomes difficult for a director of the installation to find an anchor not installed successfully, even if the director checks an installation condition from a floor after the installation. Hence, the actual situation regarding the anchor of patent literature 2 is that a worker has no other choice but to determine that installation has been finished successfully if rotation torque acting when the worker screws the anchor bolt into the anchor socket has reached a predetermined value or more. Further, for a check after the installation, the director should check installed anchors one by one with a torque wrench and the like to determine if the rotation torques thereof are at the predetermined value or more. Operation for the check leads to an excessive burden and consumes a great deal of time.

It may be requested depending on the condition of an installation site that an anchor be installed while a bolt or a deformed steel bar projects directly from a surface of a skeleton such as a ceiling structure, a wall surface, and a floor. The anchor of patent literature 1 may be responsive to such a request. However, the anchor of patent literature 1 is not suited for installation on a ceiling structure as described above and is hard to manage after its installation, so that it cannot be employed preferably. The anchor of patent literature 2 does not produce a condition where a bolt or a deformed steel bar projects directly after it is installed. To be specific, the anchor of patent literature 2 involves attachment of an additional hanging bolt to a screw hole formed in the head of the anchor bolt after the anchor is installed. This reduces working efficiency, so that the anchor of patent literature 2 also cannot be employed preferably.

The present invention has been made in view of the aforementioned conventional problems. It is an object of the present invention to provide an anchor achieving excellent working efficiency, capable of being installed such that a shaft of the anchor such as a bolt or a steel bar projects directly from a surface of a skeleton after installation, and allowing examination of an installation condition easily to allow efficient check of the anchor after the installation. It is also an object of the present invention to provide a method of installing such an anchor.

In order to achieve the aforementioned objects, the anchor of the present invention includes: an anchor bolt having a shaft provided with a male screw thread, and a bolt head provided at a base portion of the shaft; a spreading sleeve having spreading parts provided at a tip portion of a tubular body capable of being fitted on a tip portion of the shaft so as to receive the tip portion of the shaft therein, the spreading parts being formed by a longitudinally cut slot so as to spread outwardly; and a cone nut provided at its inner side a screw through hole to threadedly engage with the male screw thread formed on the shaft, the cone nut having an outer diameter gradually reduced in the axial direction of the shaft, the cone nut being attached to the tip portion of the shaft while a smaller-diameter edge part of the cone nut is fitted in a tip portion of the spreading sleeve. The shaft of the anchor bolt is composed of a thick shaft part connected to the bolt head, and a thin shaft part provided to be closer to the tip portion of the shaft than the thick shaft part, coaxial with the thick shaft part, and smaller in diameter than the thick shaft part. A step is formed between the thick shaft part and the thin shaft part. The thin shaft part is provided with a male screw thread to threadedly engage with the cone nut, and the thick shaft part is provided with a rupture portion reduced in diameter. The rupture portion is provided at a position spaced by a predetermined length from the step. The rupture portion ruptures if torque of a predetermined value or more acts on the bolt head. The spreading sleeve can be fitted on the thin shaft part of the shaft so as to receive the thin shaft part therein, and has an inner diameter that makes the spreading sleeve contact the step. The shaft of the anchor bolt is rotated in response to rotation of the bolt head of the anchor bolt to make the cone nut travel into the spreading sleeve contacting the step, thereby making the spreading parts spread outwardly. When torque of the predetermined value or more acts on the bolt head, the rupture portion ruptures to separate the bolt head.

Even if the anchor of the aforementioned structure is installed on a ceiling structure, the anchor is free from the fear of drop from the ceiling structure. Thus, the anchor can be installed on any object. After the anchor is installed successfully, the rupture portion ruptures so that the bolt head is removed. Thus, the installation condition of the anchor can be examined easily. After rupture portion ruptures, part of the thick shaft part closer to the step than the rupture portion remains without any change from its condition at the time of installation.

Preferably, in the aforementioned anchor, the anchor bolt is provided at the tip end of the thin shaft part with a shaft center projection being a projecting part of a shaft center.

More preferably, in the aforementioned anchor, the shaft and the bolt head of the anchor bolt are formed separately, and the rupture portion smaller in diameter than the shaft is formed by fitting the bolt head into a polygonal recess provided at a base end portion of the shaft. This structure makes it possible to prevent corrosion of the shaft from a rupture surface formed after rupture of the rupture portion. In order to prevent corrosion of the shaft satisfactorily, the bolt head may be made of a material having a high resistance to corrosion such as stainless and brass materials, for example. Alternatively, coating having a resistance to corrosion may be applied in advance on the recess provided at the base end portion of the shaft, for example.

A method of installing an anchor of the present invention is a method of installing the anchor having each of the aforementioned structures. The method includes: forming a fitting hole in a skeleton on which the anchor is to be installed, the fitting hole having a depth greater than the length of the thin shaft part; inserting the anchor from its tip end portion into the fitting hole such that the thick shaft part projects a predetermined length from a surface of the skeleton; making the cone nut travel into the spreading sleeve by rotating the bolt head, thereby making the spreading parts spread outwardly to make engagement between the spreading parts and the inner wall of the fitting hole; and rotating the bolt head by applying torque of the predetermined value or more to make the rupture portion rupture to separate the bolt head from the anchor.

If employed to install the anchor having the shaft center projection being a projection part of a shaft center provided at the tip end of the thin shaft part, the method preferably includes: forming a fitting hole in a skeleton on which the anchor is to be installed, the fitting hole having a depth greater than the length of the thin shaft part; inserting the anchor from its tip end portion into the fitting hole such that the thick shaft part projects a predetermined length from a surface of the skeleton while the shaft center projection is pressed against the center of the bottom of the fitting hole; making the cone nut travel into the spreading sleeve by rotating the bolt head, thereby making the spreading parts spread outwardly to make engagement between the spreading parts and the inner wall of the fitting hole; and rotating the bolt head by applying torque of the predetermined value or more to make the rupture portion rupture to separate the bolt head from the anchor.

The anchor of the aforementioned structure or the method of installing the anchor achieves excellent working efficiency, allows the anchor to be installed such that the shaft such as a bolt or a steel bar projects directly from the surface of the skeleton after installation, and allows examination of an installation condition easily to allow efficient check of the anchor after the installation.

BRIEF DESCRIPTION OF THE DRAWINGS

FIGS. 8A to 8C show a modification where a shaft and a bolt head of an anchor bolt are formed separately.

DESCRIPTION OF THE PREFERRED EMBODIMENTS

Figure 1:
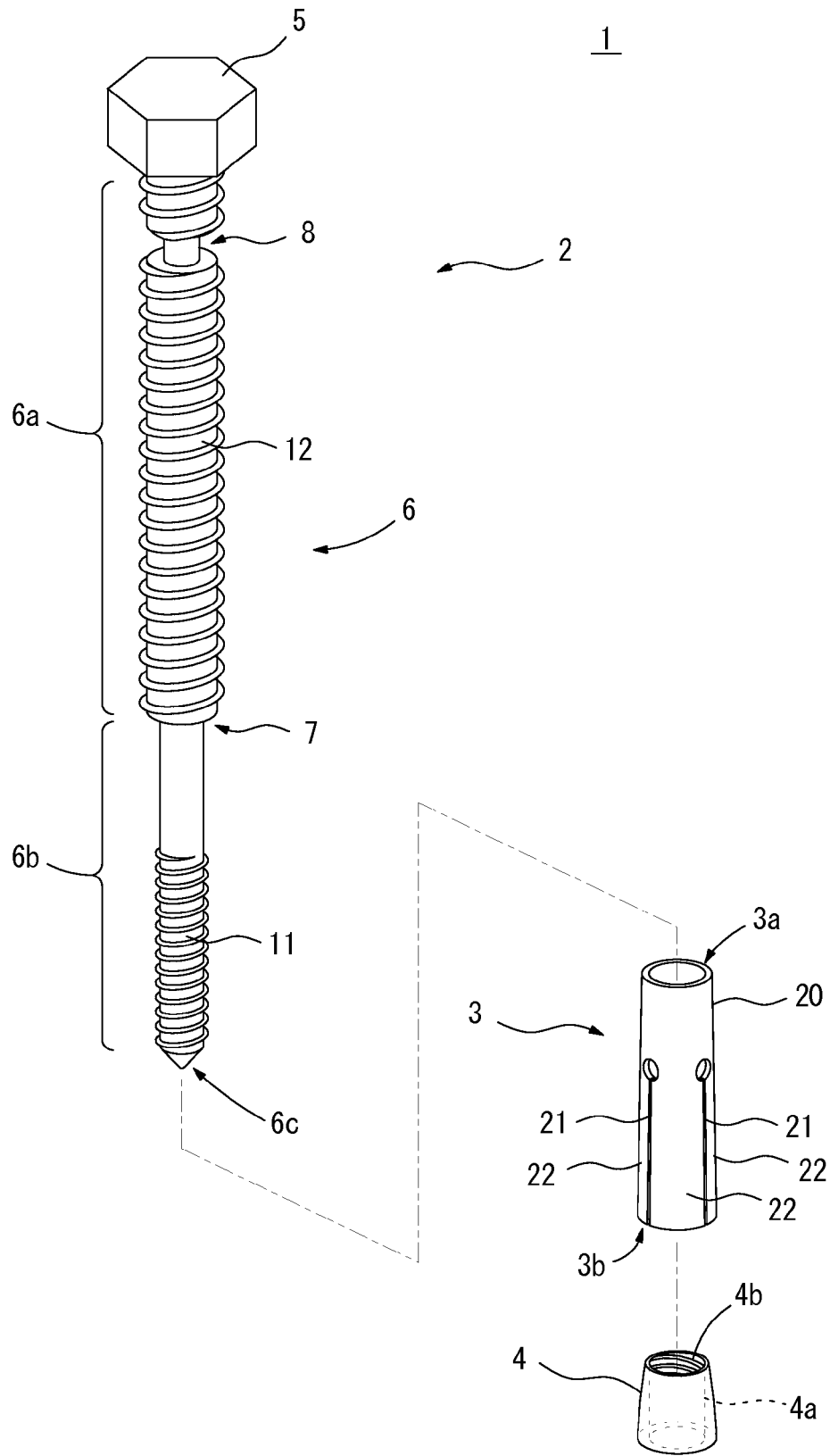
FIG. 1 is a perspective view of an anchor with all parts of the anchor separated.

A preferred embodiment of the present invention is described in detail below with reference to the drawings. Elements shared among the drawings to be referred to in the description below are represented by the same reference numerals, and are not described repeatedly.

Figure 2:
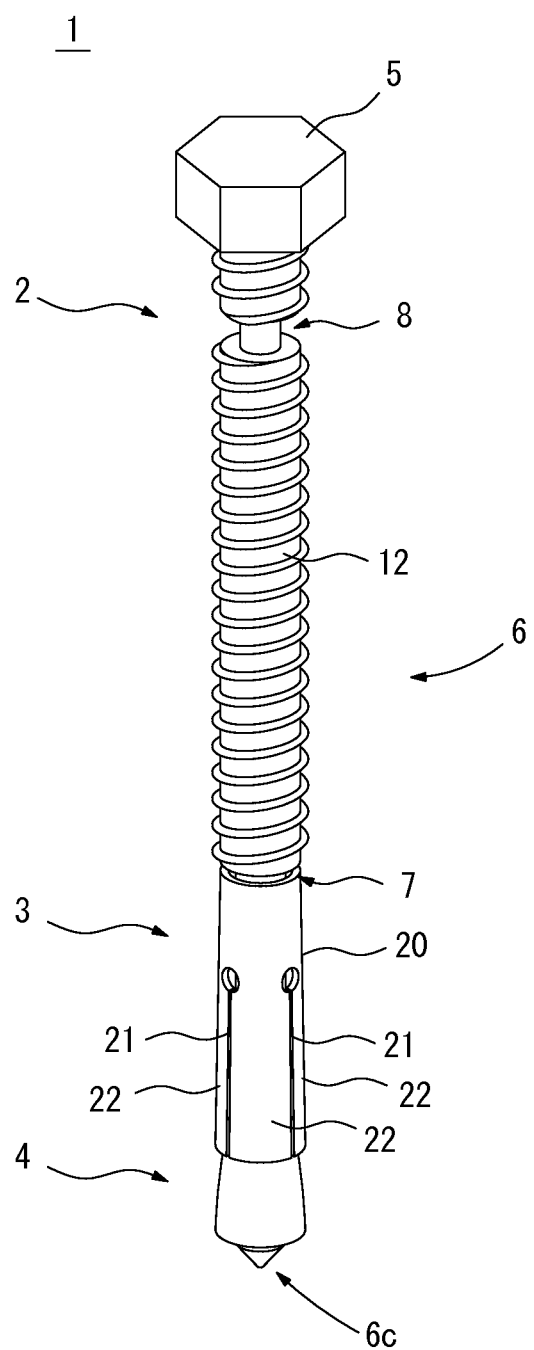
FIG. 2 is a perspective view of the anchor with all the parts of the anchor assembled.
Figure 3:
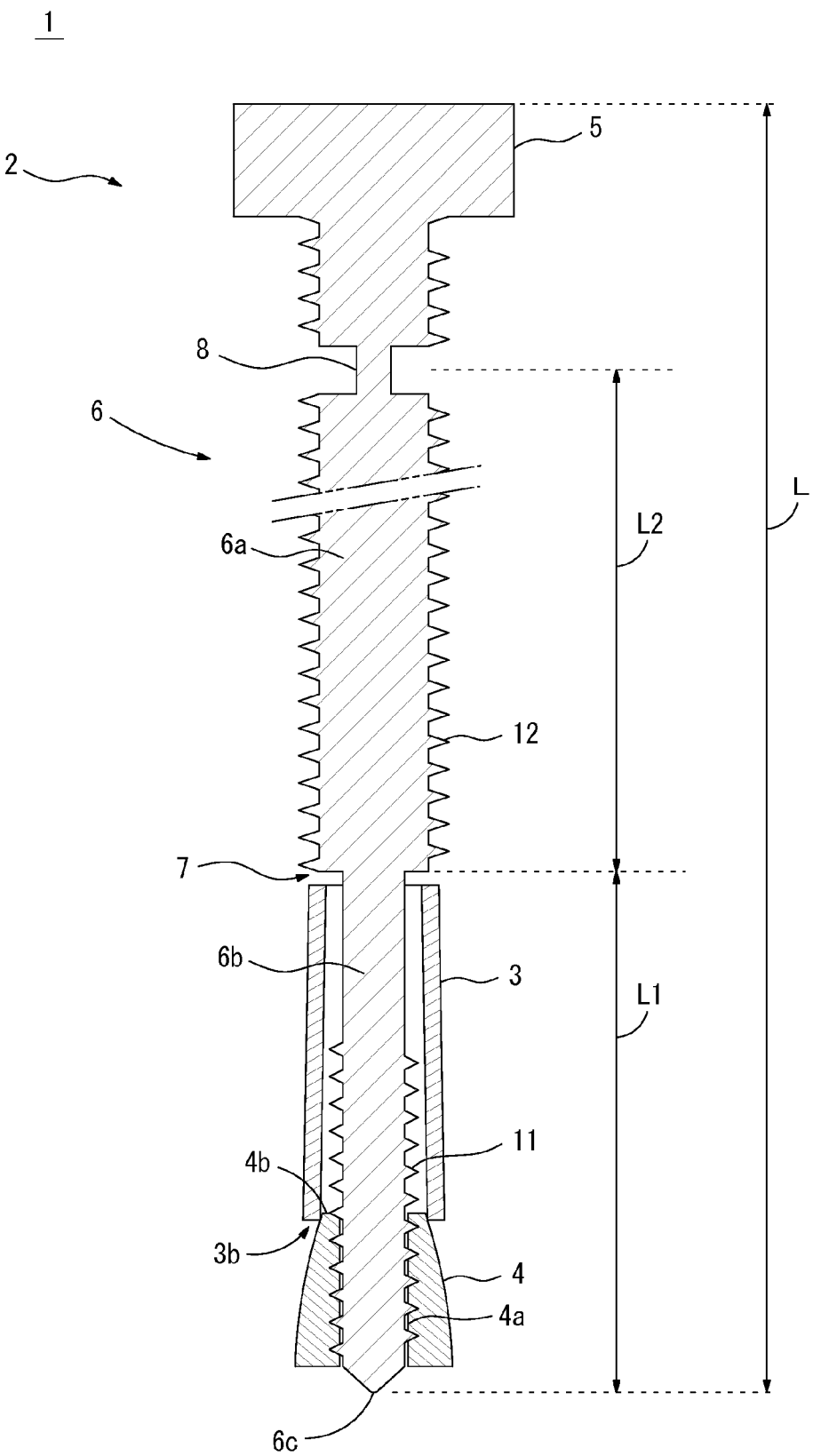
FIG. 3 is a longitudinal sectional view of the anchor with all the parts of the anchor assembled.

FIG. 1 is a perspective view of an anchor 1 of a preferred embodiment of the present invention with all parts of the anchor 1 separated. FIGS. 2 and 3 are a perspective view and a longitudinal sectional view respectively of the anchor 1 with all the parts of the anchor 1 assembled.

As shown in FIG. 1, the anchor 1 of the preferred embodiment is a metallic anchor composed of an anchor bolt 2, a spreading sleeve 3, and a cone nut 4. The anchor 1 is to be attached and fixed to various types of skeletons such as concrete buildings and structures, and is applicable to all of a ceiling structure, a wall surface, and a floor.

The anchor bolt 2 has a bolt head 5 and a shaft 6 coupled to each other. The bolt head 5 is formed for example into a hexagonal column for allowing attachment of a tool thereto such as a spanner and an impact wrench. The shaft 6 has a base portion connected to an end surface of the bolt head 5.

The shaft 6 of the anchor bolt 2 has a thick shaft part 6a connected to the bolt head 5, and a thin shaft part 6b provided to be closer to a tip portion of the shaft 6 than the thick shaft part 6a, coaxial with the thick shaft part 6a, and smaller in diameter than the thick shaft part 6a. A step 7 is formed between the thick shaft part 6a and the thin shaft part 6b. A shown in FIG. 3, with respect to a length L of the anchor bolt 2 in the axial direction, the step 7 is formed at a position spaced by a length L1 from the tip end of the shaft 6, for example.

The thin shaft part 6b is provided at least at its tip portion with a male screw thread 11 for attachment of the cone nut 4. The thin shaft part 6b is also provided at its tip end with a shaft center projection 6c formed by making the shaft center project conically. Except for part of the thick shaft part 6a, the substantially entire part of thick shaft part 6a is larger in shaft diameter than the thin shaft part 6b. The thick shaft part 6a is provided, at a position spaced by a length L2 (see FIG. 3) from the step 7 between the thick shaft part 6a and the thin shaft part 6b, with a rupture portion 8 formed by reducing the shaft diameter of the thick shaft part 6a. The thick shaft part 6a is provided with a male screw thread 12 covering the substantially entire part of the thick shaft part 6a except the rupture portion 8. The thick shaft part 6a is to project directly from a surface of a skeleton after installation of the anchor 1 is finished. Thus, after installation of the anchor 1, a nut can be attached directly to the male screw thread 12 formed on the thick shaft part 6a.

The rupture portion 8 is formed by cutting out the outer circumference of the thick shaft part 6a for example into a rectangle, as shown in the drawings. However, this is not the only shape of the rupture portion 8, but the rupture portion 8 may be formed by cutting out the outer circumference of the thick shaft part 6a into a triangle or an arc. The rupture portion 8 may also be provided by forming a cut in the form of a thin slit. The rupture portion 8 can be provided at the base portion of the shaft 6 where the thick shaft part 6a is connected to the bolt head 5.

The rupture portion 8 is formed such that the thinnest part thereof has a diameter of a previously designed value. In response to operation to rotate the bolt head 5, a shear stress acts on the rupture portion 8 reduced in diameter. If torque of a predetermined value or more acts on the bolt head 5, the shear stress acting on the rupture portion 8 exceeds its limit to allow the rupture portion 8 to rupture.

The spreading sleeve 3 and the cone nut 4 are fitted in this order from the tip end of the shaft 6 on the thin shaft part 6b of the anchor bolt 2 of the aforementioned structure so as to receive the thin shaft part 6b therein, thereby making up the anchor 1.

The spreading sleeve 3 is configured as a tubular body 20 to receive the thin shaft part 6b of the anchor bolt 2 therein such that the thin shaft part 6b passes through the tubular body 20. The inner diameter of the tubular body 20 is determined so as to allow insertion of the thin shaft part 6b of the shaft 6 therein and to make the tubular body 20 contact the step 7. To be specific, once the spreading sleeve 3 is fitted on the shaft 6 from the tip end thereof so as to receive the shaft 6 therein, an edge portion 3a on one side contacts the step 7 to make the spreading sleeve 3 stay at the thin shaft part 6b, so that the spreading sleeve 3 does not reach the thick shaft part 6a. The outer diameter of the tubular body 20 is determined to be substantially the same as that of the thick shaft part 6a of the anchor bolt 2. The tubular body 20 does not necessarily have the aforementioned tubular shape, but the tubular shape thereof may also be formed by bending a steel plate to have the aforementioned diameter, for example.

The spreading sleeve 3 is given a plurality of longitudinally cut slots provided at a tip portion 3b of the tubular body 20, and sections defined by the slots 21 form spreading parts 22 to spread outwardly and radially. The spreading parts 22 of the preferred embodiment have smooth outer circumferences, to which the present invention is not intended to be limited. The outer circumferences of the spreading parts 22 may each be given one or a plurality of ribs extending in the circumferential direction, for example. The number of the spreading parts 22 provided at the tip portion 3b of the spreading sleeve 3 is generally three or four. Meanwhile, five or more spreading parts 22 may be provided. The spreading sleeve 3 of this structure is fitted on the thin shaft part 6b so as to receive the thin shaft part 6b therein, in such a manner that the tip portion 3b with the spreading parts 22 is pointed toward the tip end of the shaft 6 of the anchor bolt 2.

The cone nut 4 is attached to the thin shaft part 6b of the shaft 6. The outer shape of the cone nut 4 is a substantially truncated cone the outer diameter of which is gradually reduced in the axial direction, and the circumferential side surface of the cone nut 4 forms a smoothly tapered surface. The cone nut 4 is provided at its inner central part a screw through hole 4a to threadedly engage with the male screw thread 11 formed on the thin shaft part 6b of the shaft 6. The cone nut 4 has a smaller-diameter edge part 4b formed so as to have a diameter slightly smaller than the inner diameter of the spreading sleeve 3 at the tip portion 3b. Further, the cone nut 4 has a larger-diameter edge part on the opposite side formed so as to be substantially the same or slightly larger in outer diameter than the tubular body 20 of the spreading sleeve 3. As shown in FIG. 3, the cone nut 4 is threadedly attached to the thin shaft part 6b of the shaft 6 while the smaller-diameter edge part 4b is slightly fitted in the tip portion 3b of the spreading sleeve 3.

As described above, the spreading sleeve 3 and the cone nut 4 are fitted sequentially from the tip end of the shaft 6 on the thin shaft part 6b to be combined with the anchor bolt 2, thereby making up the anchor 1 ready for installation. It is preferable that the anchor 1 be assembled such that the shaft center projection 6c at the tip end of the shaft 6 of the anchor bolt 2 projects from an edge of the cone nut 4 as shown in FIGS. 2 and 3.

Figure 4:
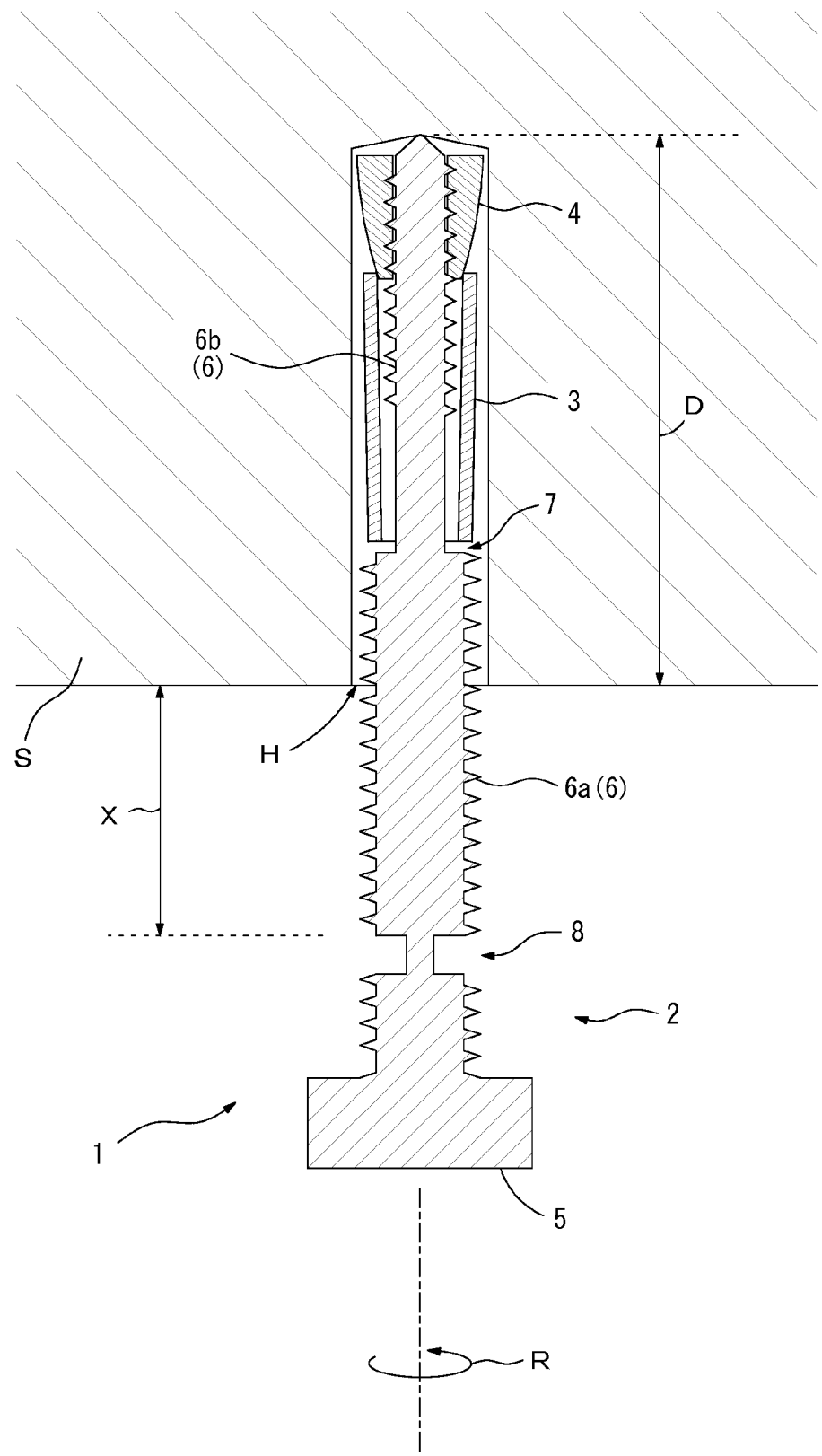
FIG. 4 shows a first installation step of a process of installing the anchor.
Figure 5:
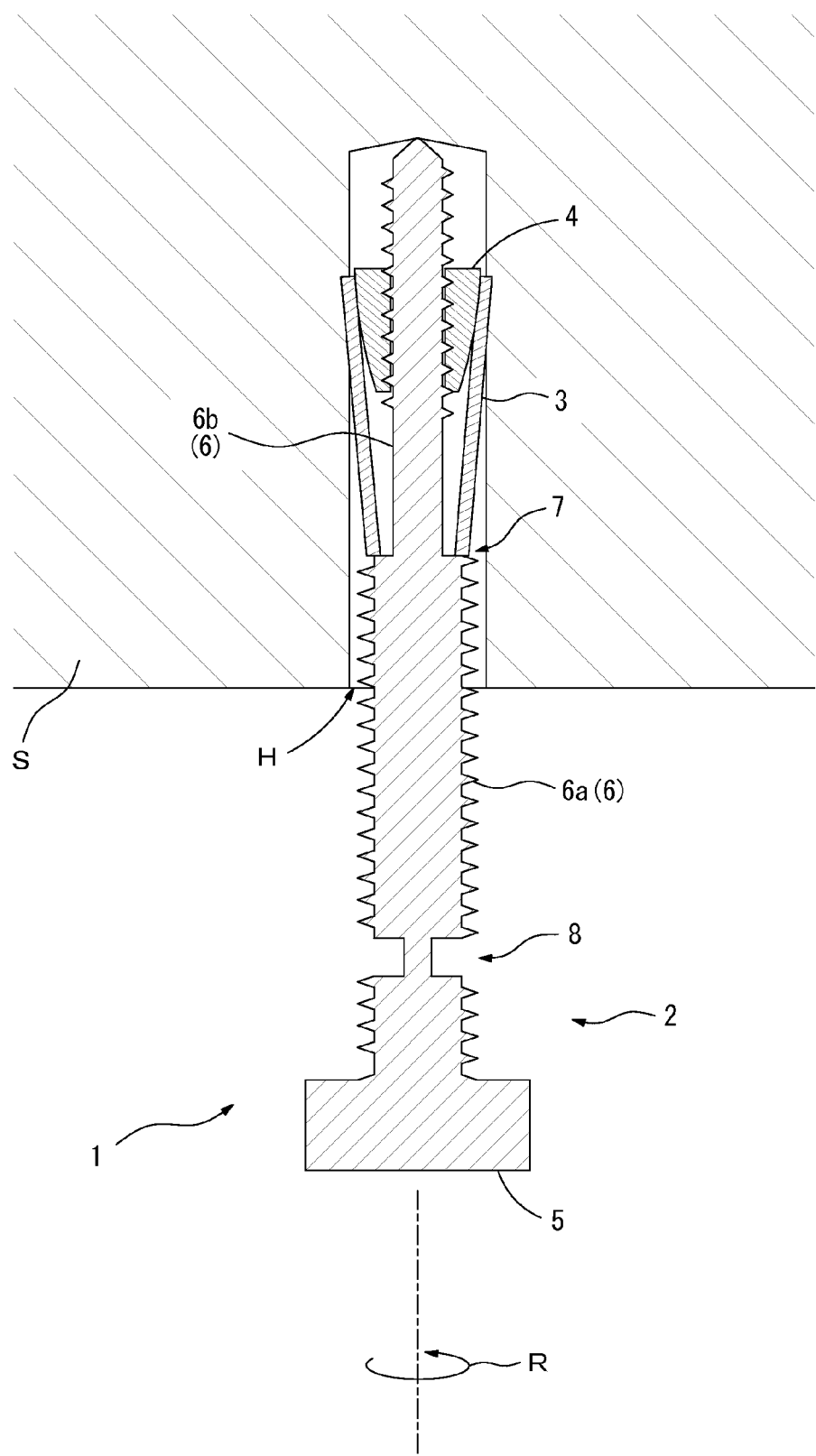
FIG. 5 shows a second installation step of the process of installing the anchor.
Figure 6:
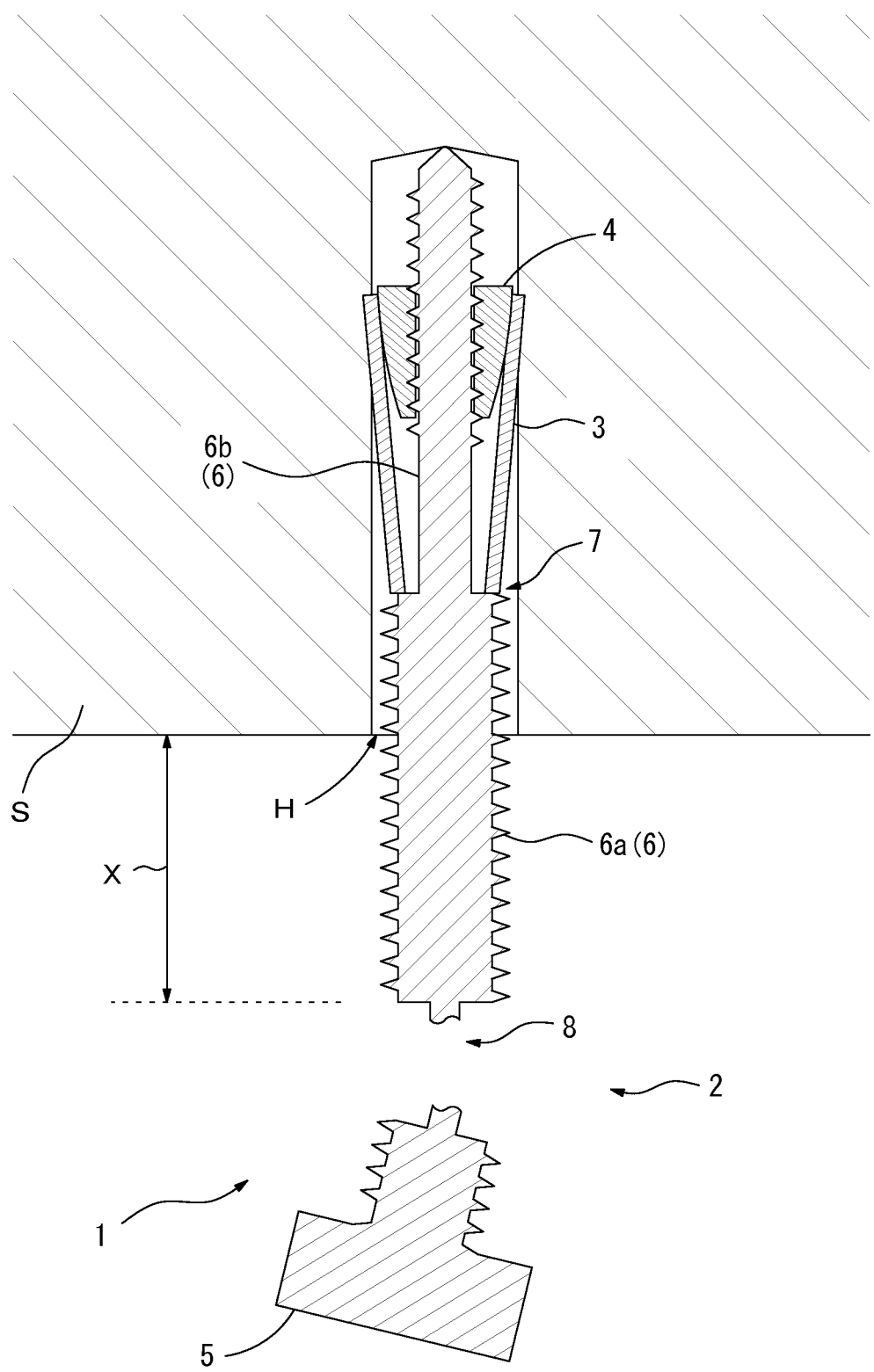
FIG. 6 shows a third installation step of the process of installing the anchor.

Installation of the anchor 1 of the preferred embodiment is described next. FIGS. 4, 5 and 6 show exemplary procedure of installation of the anchor 1. First, as shown in FIG. 4, a fitting hole H in which the anchor 1 is to be fitted is formed with a tool such as a drill in a skeleton S such as a ceiling structure made for example of concrete. The fitting hole H is not formed to have a diameter same as the outer diameter of the shaft 6 of the anchor 1 but to have a diameter slightly larger than the outer diameter of the shaft 6 of the anchor 1. Meanwhile, the anchor 1 cannot be installed properly if the diameter of the fitting hole H is excessively larger than the outer diameter of the shaft 6 of the anchor 1. Thus, it is preferable that the diameter of the fitting hole H be a few percent larger than the outer diameter of the thickest part of the shaft 6 of the anchor 1 (outer diameter of the spreading sleeve 3 or the cone nut 4, for example).

It is preferable that a depth D of the fitting hole H be determined so as to allow fitting of part of the thick shaft part 6a of the anchor bolt 2 in the fitting hole H. To be specific, where the length of the shaft 6 of the anchor bolt 2 between the tip end and the step 7 is defined as L1, it is preferable that the depth D of the fitting hole H be greater than L1. This allows part of the thick shaft part 6a close to the tip end thereof to be fitted into the fitting hole H when the shaft 6 of the anchor 1 is inserted into the fitting hole H. Thus, if external force acting for example horizontally is applied to the shaft 6 projecting from a surface of the skeleton S after installation of the anchor 1, the external force can be absorbed by the thick shaft part 6a fitted in the fitting hole H. In contrast, if the thick shaft part 6a is not fitted in the fitting hole H partially, external force acting for example horizontally and applied to the shaft 6 projecting from the surface of the skeleton S should be absorbed only by the thin shaft part 6b fitted in the fitting hole H. In this case, the thin shaft part 6b may be broken. In order to avoid such damage on the thin shaft part 6b, it is preferable that the depth D of the fitting hole H be greater than L1 to allow fitting of part of the thick shaft part 6a of the anchor bolt 2 in the fitting hole H.

It is further preferable that the depth D of the fitting hole H be determined to be a depth calculated in advance based on a length X the shaft 6 is to project from the surface of the skeleton S after the anchor 1 is installed. By referring to FIG. 3, where the length of the shaft 6 of the anchor bolt 2 between its tip end and the step 7 is defined as L1 and the length thereof between the step 7 and the rupture portion 8 is defined as L2, for example, the depth D of the fitting hole H to make the shaft 6 project the length X from the surface of the skeleton S is determined as D=L1+L2−X. Hence, it is preferable that the fitting hole H be formed into the depth D calculated by this formula.

If the fitting hole H is formed with a generally used tool such as a drill, the bottom of the fitting hole H is cut into a circular cone and the center of the bottom becomes the deepest part of the fitting hole H.

Next, as shown in FIG. 4, the shaft 6 of the anchor 1 is inserted into the fitting hole H formed. The diameter of the fitting hole H is slightly larger than the outer diameter of the shaft 6, so that the shaft 6 can be inserted by hand relatively smoothly without using a tool such as a hammer. If the fitting hole H is formed to have the depth D calculated by the aforementioned formula, the shaft 6 is pushed into the fitting hole H until the tip end of the shaft 6 reaches the bottom of the fitting hole H. When insertion of the shaft 6 is finished, part of the thick shaft part 6a of the shaft 6 of the anchor bolt 2 close to the tip end of the shaft 6 is placed in the fitting hole H. In this condition, the respective outer circumferences of the thick shaft part 6a, the spreading sleeve 3, and the cone nut 4 are in contact with or in proximity to the inner wall of the fitting hole H.

The thickness of the spreading sleeve 3 may be determined to be greater than a gap between the thick shaft part 6a and the inner wall of the fitting hole H formed when the shaft 6 of the anchor 1 is inserted into the fitting hole H.

After the shaft 6 of they anchor 1 is inserted in the fitting hole H as shown in FIG. 4, a tool such as an impact wrench is attached to the bolt head 5 of the anchor bolt 2 to rotate the bolt head 5 of the anchor bolt 2 in a direction (tightening direction) shown by an arrow R of FIG. 4.

At this time, if the tip end of the shaft 6 abuts on the bottom of the fitting hole H, the shaft center projection 6c of the shaft 6 engages with the center of the bottom of the fitting hole H. Hence, by rotating the bolt head 5 of the anchor bolt 2 while pressing the bolt head 5 deeper into the fitting hole H, shaft deviation is suppressed at the tip end of the anchor bolt 2. This realizes relatively smooth rotating operation to enhance working efficiency. Thus, determining the depth D of the fitting hole H to be the depth D calculated by the aforementioned formula enhances working efficiency. For installation on a ceiling structure, a worker may use an extension tool and the like to insert the anchor 1 into the fitting hole H and rotate the bolt head 5 of the anchor bolt 2 from a floor.

In response to operation by the worker to rotate the bolt head 5, the anchor bolt 2 rotates the shaft 6. At this time, the shaft 6 may be tilted or may deviate slightly to make the larger-diameter edge part of the cone nut 4 partially contact the inner wall of the fitting hole H. Thus, the cone nut 4 receives a resistance from the inner wall of the fitting hole H contacting the cone nut 4, so that rotation of the shaft 6 does not rotate the cone nut 4 simultaneously. As a result, in response to the rotation of the shaft 6, the cone nut 4 is threadedly driven along the male screw thread 11 formed on the thin shaft part 6a to move along the thin shaft part 6b toward the step 7.

The smaller-diameter edge part 4b of the cone nut 4 is slightly fitted in the tip portion 3b of the spreading sleeve 3. Thus, when the cone nut 4 starts to move toward the step 7, the spreading sleeve 3 also moves toward the step 7. When the opposite edge portion 3a of the spreading sleeve 3 comes into contact with the step 7, the movement of the spreading sleeve 3 is regulated to keep the spreading sleeve 3 at a position where the spreading sleeve 3 contacts the step 7.

As described above, by making the thickness of the spreading sleeve 3 greater than the gap between the thick shaft part 6a and the inner wall of the fitting hole H, the spreading sleeve 3 is not allowed to enter into the gap between the thick shaft part 6a and the inner wall of the fitting hole H. Hence, even if force of such a strength that makes the spreading sleeve 3 go over the step 7 acts on the spreading sleeve 3, the spreading sleeve 3 does not cross over the step 7 into the outer circumference of the thick shaft part 6a, so that the spreading sleeve 3 can be positioned at the step 7.

If the bolt head 5 is rotated further, the cone nut 4 travels along the thin shaft part 6b toward the step 7 in response to rotation of the shaft 6. At this time, the spreading sleeve 3 does not move, so that the cone nut 4 gradually travels further from the smaller-diameter edge part 4b of the cone nut 4 into the spreading sleeve 3. As a result, the cone nut 4 makes the spreading parts 22 of the spreading sleeve 3 spread outwardly as shown in FIG. 5. The spreading parts 22 of the spreading sleeve 3 expand outwardly and radially so as to press the inner wall of the fitting hole H, thereby fixing the anchor 1 gradually in the fitting hole H.

Once the spreading parts 22 of the spreading sleeve 3 spread outwardly to contact the inner wall of the fitting hole H, rotational force to act on the bolt head 5 thereafter makes the cone nut 4 travel further into the spreading sleeve 3 to make the spreading parts 22 spread outwardly and radially. In other words, the spreading parts 22 of the spreading sleeve 3 gradually spread more widely to increase pressure on the inner wall of the fitting hole H. This increases force in order for the cone nut 4 to travel further into the spreading sleeve 3, thereby increasing torque required to rotate the bolt head 5.

As shown in FIG. 5, when the spreading parts 22 of the spreading sleeve 3 have spread enough to fix the anchor 1 in the fitting hole H with sufficient strength, torque applied for rotating the bolt head 5 becomes a predetermined value or more. If torque not falling below the predetermined value acts on the bolt head 5, the rupture portion 8 formed at the shaft 6 of the anchor bolt 2 ruptures so that the bolt head 5 of the anchor bolt 2 is separated from the shaft 6, as shown in FIG. 6. To be specific, according to the anchor 1, a worker or a director of the installation is notified of the fact that sufficient tightening strength is achieved so the anchor 1 has been installed successfully by seeing the rupture of the rupture portion 8 formed at the shaft 6 of the anchor bolt 2 and separation of the bolt head 5.

If tightening torque applied to the bolt head 5 falls below a predetermined lower limit, the anchor 1 is not tightened enough so that sufficient strength cannot be achieved. In this case, installation of the anchor 1 ends in failure. Meanwhile, if tightening torque applied to the bolt head 5 exceeds a predetermined upper limit, the anchor 1 is tightened excessively. In this case, installation of the anchor 1 also ends in failure. To be specific, for the anchor 1 of this type, the upper and lower limits of tightening torque are defined as conditions for fixing the anchor 1 with sufficient strength. Thus, in the preferred embodiment, in order for the rupture portion 8 to rupture if the optimum torque which is for example at a value intermediate between the aforementioned lower and upper limits acts on the bolt head 5 of the anchor bolt 2, the rupture portion 8 is formed to have a diameter at a previously designed value. Thus, rupture of the rupture portion 8 shows that the anchor 1 is fixed by applying the optimum tightening torque. Even if a slight error is generated in torque acting to make the rupture portion 8 rupture, this torque can be made to fall within a range between the lower and upper limits. As a result, insufficient tightening or excessive tightening of the anchor 1 can be prevented favorably, and the anchor 1 can be fixed in a favorable condition to the skeleton S.

After the rupture portion 8 ruptures as described above, the bolt head 5 of the anchor bolt 2 is removed from the anchor 1 installed on the skeleton S. Thus, in the preferred embodiment, installation of the anchor 1 can be managed by collecting the bolt head 5. As an example, a director of the installation collects separated bolt heads 5 from a worker, and checks to see if the number of anchors 1 installed for example on a ceiling structure and the number of the collected bolt heads 5 are the same. If these numbers are the same, the director can know that all the anchors 1 have been installed successfully. Meanwhile, if these numbers are not the same, there is an anchor 1 yet to be installed or installed unsuccessfully. In this case, the director checks a ceiling structure and the like visually to find a fitting hole H in which an anchor 1 is not fitted or an anchor 1 with the bolt head 5 remaining unseparated. Only doing so makes it possible to specify the uninstalled anchor 1 or the anchor 1 installed unsuccessfully. As described, the anchor 1 of the preferred embodiment makes it possible to check the condition of installation of the anchor 1 easily by visual inspection, even after installation of the anchor 1 is finished.

After the rupture portion 8 ruptures and the bolt head 5 is removed, the shaft 6 (thick shaft part 6a) projects the length X from the surface of the skeleton S. Thus, the anchor 1 becomes capable of supporting a hanging object directly by attaching a nut and the like to the male screw thread 12 on the projecting thick shaft part 6a. To be specific, without involving attachment of an additional hanging bolt after installation of the anchor 1, the anchor 1 of the preferred embodiment allows a hanging object and the like to be attached directly to the shaft 6 projecting from the skeleton S, thereby achieving favorable working efficiency.

As described above, the anchor 1 of the preferred embodiment includes the anchor bolt 2, the spreading sleeve 3, and the cone nut 4. The shaft 6 of the anchor bolt 2 is composed of the thick shaft part 6a connected to the bolt head 5, and the thin shaft part 6b provided to be closer to the tip portion of the shaft 6 than the thick shaft part 6a. The step 7 is formed between the thick shaft part 6a and the thin shaft part 6b. The thin shaft part 6b is provided with the male screw thread 11 to threadedly engage with the cone nut 4. The thick shaft part 6a is provided, at a position spaced by the length L2 from the step 7, with the rupture portion 8 smaller in diameter than the thick shaft part 6a. The rupture portion 8 ruptures if torque of a predetermined value or more acts on the bolt head 5. The spreading sleeve 3 can be fitted on the thin shaft part 6b of the shaft 6 so as to receive the thin shaft part 6b therein, and has an inner diameter that makes the spreading sleeve 3 contact the step 7. According to the anchor 1 of the preferred embodiment, the shaft 6 is rotated in response to rotation of the bolt head 5 to make the cone nut 4 travel into the spreading sleeve 3 contacting the step 7, thereby making the spreading parts 22 spread outwardly. When torque of the predetermined value or more acts on the bolt head 5, the rupture portion 8 ruptures to separate the bolt head 5.

In the anchor 1 of the aforementioned structure, the cone nut 4 is threadedly coupled to the thin shaft part 6b of the shaft 6. Thus, the cone nut 4 does not fall off the inside of the spreading sleeve 3 even if the anchor 1 is installed on a ceiling structure, so that the anchor 1 will not drop. Further, regarding installation of the anchor 1, the anchor 1 is fitted into the fitting hole H of a diameter slightly larger than the outer diameter of the shaft 6. Thus, inserting the anchor 1 into the fitting hole H does not involve a tool such as a hammer, leading to favorable working efficiency. After the anchor 1 is inserted in the fitting hole H, the anchor 1 can be fixed by tightening the bolt head 5 with a generally used tool with no torque management function such as a spanner and an impact wrench. To be specific, a worker can fix the anchor 1 only by rotating the bolt head 5 even with a generally used tool. Further, the spreading sleeve 3 can be prevented from coming off through the outer side of the thick shaft part 6a during installation of the anchor 1. After the anchor 1 is fixed with sufficient strength, the rupture portion 8 ruptures to separate the bolt head 5. This prevents a problem such as excessive tightening, and allows the anchor 1 to be checked easily after the installation. Additionally, after the installation, the shaft 6 can project directly from the surface of the skeleton S, so that even work after the installation of the anchor 1 can be conducted with favorable working efficiency.

In the anchor 1 of the preferred embodiment, the anchor bolt 2 is provided at the tip end of the thin shaft part 6b with the shaft center projection 6c being a projecting part of a shaft center. Thus, by rotating the bolt head 5 while pressing the shaft center projection 6c against the center of the bottom of the fitting hole H, shaft deviation is suppressed at the tip end of the anchor bolt 2. This also leads to favorable working efficiency.

The aforementioned anchor 1 belongs to one preferred embodiment of the anchor of the present invention, and the specific structure of which can be changed where appropriate without departing from the substance of the present invention. As an example, the aforementioned anchor 1 can be applied suitably as an anchor for fixation even to a ceiling structure. However, the purpose of the anchor 1 is not limited to fixation to a ceiling structure, but the anchor 1 may be fixed in the same manner as that described above to a wall surface or a floor, for example.

Figure 7:
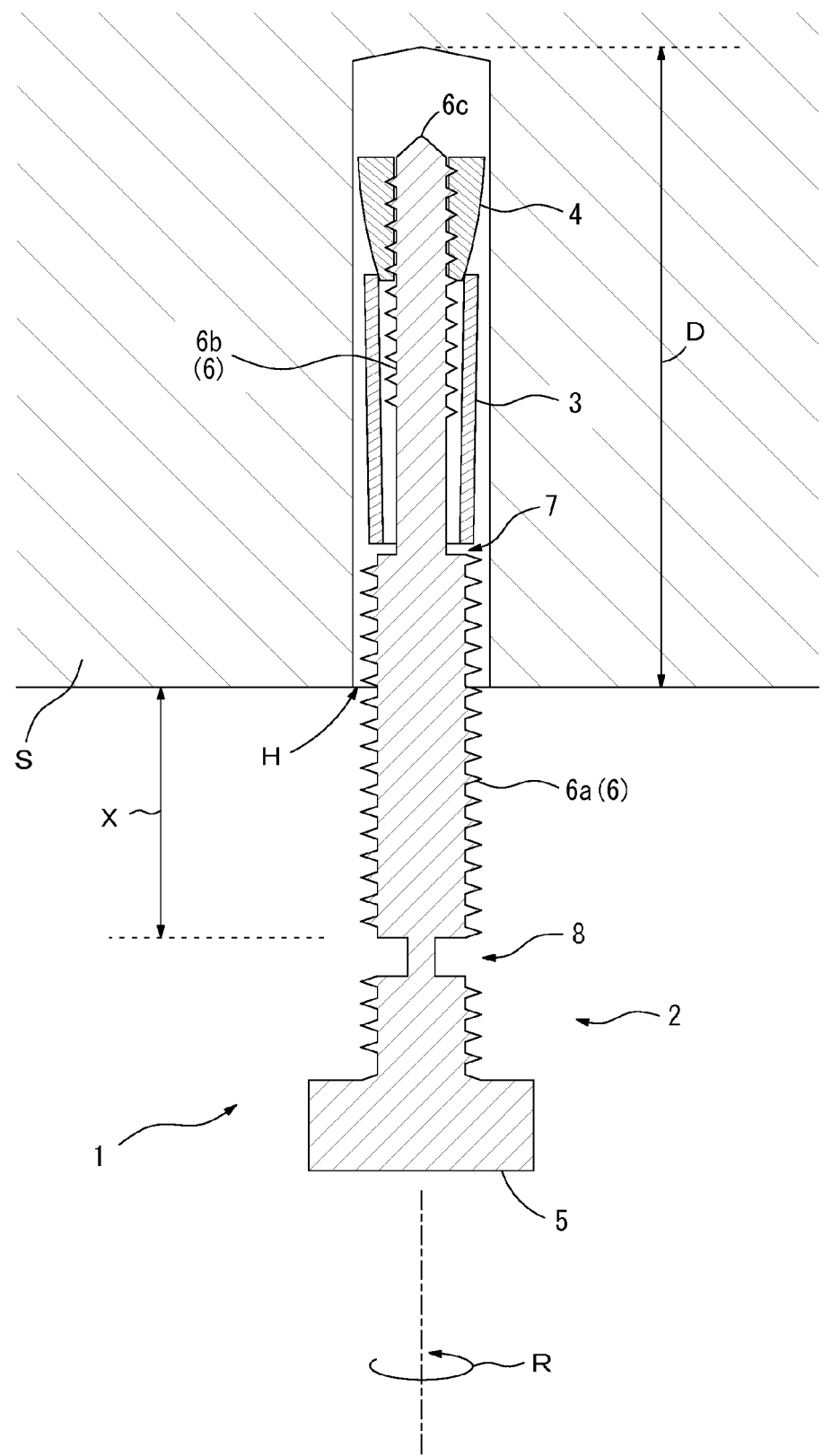
FIG. 7 shows an example of installation of the anchor fitted in a fitting hole greater in depth than that of a fitting hole of FIGS. 4 to 6.

In the preferred embodiment described above, the fitting hole H to be formed for installation of the anchor 1 has the depth D calculated by the aforementioned formula. However, the depth D of the fitting hole H is not limited to one calculated by the aforementioned formula. To be specific, the anchor 1 of the preferred embodiment can be fitted into the fitting hole H of a depth greater than the depth calculated by the aforementioned formula, as long as the depth of this fitting hole H is greater than the length L1 of the thin shaft part 6b. FIG. 7 shows an example of the anchor 1 fitted in such a deep fitting hole H. As shown in FIG. 7, if the depth D of the fitting hole H is greater than the depth calculated by the aforementioned formula, the shaft center projection 6c at the tip end of the shaft 6 is spaced from the bottom of the fitting hole H after the anchor 1 is installed such that the shaft 6 projects the length X from the surface of the skeleton S. In order to achieve this condition, it is preferable that the side surface of the shaft 6 be given a mark with coating and the like in order to fit the anchor 1 into the fitting hole H to the same level as the surface of the skeleton S. After the anchor 1 is placed in the condition shown in FIG. 7, the bolt head 5 is rotated while the shaft center projection 6c remains spaced from the bottom of the fitting hole H. In this case, shift deviation becomes larger as the tip end of the shaft 6 cannot be fixed, so that it becomes hard to conduct work efficiently. However, once the larger-diameter edge part of the cone nut 4 partially contacts the inner wall of the fitting hole H as described above, the cone nut 4 is threadedly driven along the male screw thread 11 on the thin shaft part 6b. Then, the spreading parts 22 of the spreading sleeve 3 spread to contact the inner wall, and thereafter, the bolt head 5 can be rotated stably to fix the anchor 1 to the position shown in FIG. 7. This way of installation does not require the shaft center projection 6c at the tip end of the shaft 6.

However, the installation of the anchor 1 shown in FIG. 7 is not suited as installation on a floor or on the ground, as it makes the anchor 1 drop under its own weight to the bottom of the fitting hole H formed in a floor or the ground when the anchor 1 is inserted into the fitting hole H. This makes it difficult to install the anchor 1 while the shaft center projection 6c remains spaced from the bottom. Hence, it is preferable that the installation shown in FIG. 7 be applied as installation on a wall surface or a ceiling structure.

In the aforementioned preferred embodiment, the thick shaft part 6a of the anchor bolt 2 is provided with the male screw thread 12. Where a bolt to be used for attachment of a nut after installation of the anchor 1 is requested to project from the surface of the skeleton S, it is preferable that the thick shaft part 6a be provided with the male screw thread 12 as in the aforementioned preferred embodiment. Meanwhile, where a member such as a deformed steel bar is requested to project from the surface of the skeleton S, the thick shaft part 6a may be composed of the deformed steel bar. Hence, in this case, the male screw thread 12 is not necessarily required to be provided to the thick shaft part 6a.

In the aforementioned preferred embodiment, the rupture portion 8 provided to the anchor bolt 2 is formed integrally with the shaft 6 and the bolt head 5. In this structure, if the anchor bolt 2 is made for example of steel, rupture of the rupture portion 8 in response to application of torque of a predetermined value or more may generate the fear of development of corrosion of the shaft 6 from a rupture surface of the rupture portion 8. Hence, the shaft 6 and the bolt head 5 of the anchor bolt 2 may also be formed separately as shown in FIGS. 8A to 8C and 9A to 9C.

FIGS. 8A to 8C show a modification where the shaft 6 and the bolt head 5 of the anchor bolt 2 are formed separately. In this modification, a polygonal recess 6d is formed at an edge of the shaft 6 (thick shaft part 6a) made of steel as shown in FIG. 8A. The bolt head 5 is made of a material having a high resistance to corrosion such as stainless and brass materials. As shown in FIG. 8A, the bolt head 5 is provided at its one end with a shaft 5a in the form of a polygonal column to be fitted in the recess 6d of the shaft 6. After the shaft 5a of the bolt head 5 is fitted into the recess 6d as shown in FIG. 8B, the shaft 5a becomes the rupture portion 8. When rotational force acts on the bolt head 5, the shaft 6 rotates together with the bolt head 5 until torque acting on the rupture portion 8 becomes a predetermined value or more. When the torque acting on the rupture portion 8 becomes the predetermined value or more, the rupture portion 8 ruptures as shown in FIG. 8C. In this modification, if the bolt head 5 is made of a material having a high resistance to corrosion, for example, the shaft 6 does not start to corrode from a rupture surface formed after rupture of the rupture portion 8. Even if the bolt head 5 is made of steel, coating having a resistance to corrosion may be applied in advance on the recess 6d of the shaft 6, for example. In doing so, even if corrosion starts to develop from the rupture surface after rupture of the rupture portion 8, the corrosion will not reach as far as the shaft 6.

Figure 9C:
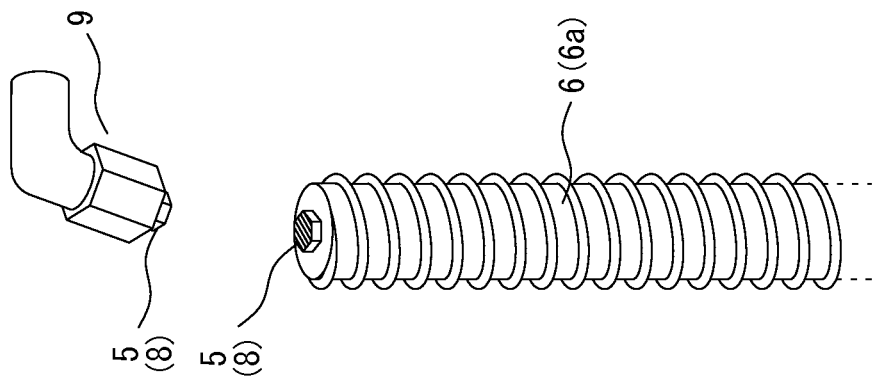
FIGS. 9A to 9C show a modification of the structure of FIGS. 8A to 8C.
Figure 9B:
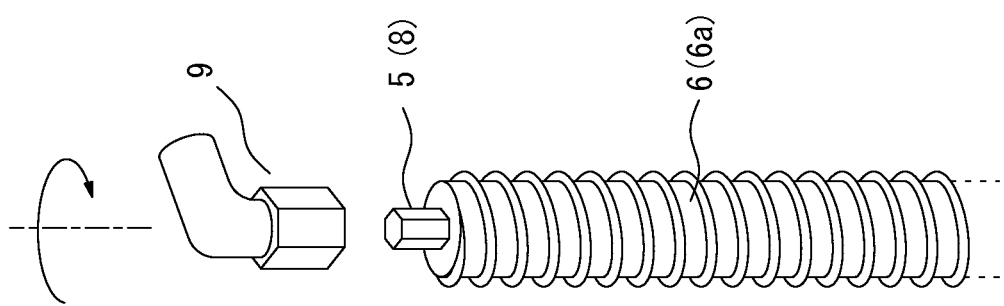
Figure 9A:
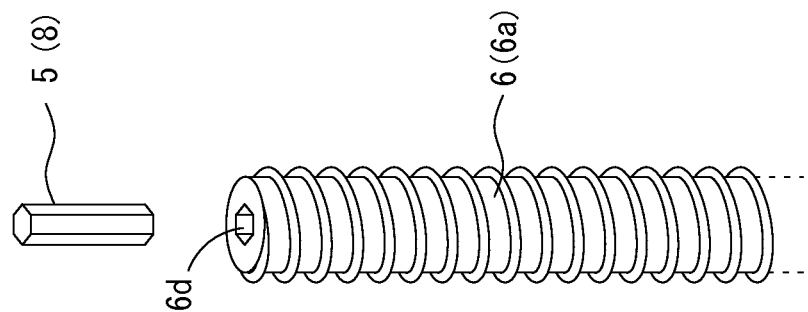

FIGS. 9A to 9C show a modification of the structure of FIGS. 8A to 8C. In the modification of FIGS. 9A to 9C, the polygonal recess 6d is formed at the edge of the shaft 6 like in FIGS. 8A to 8C. Unlike in FIGS. 8A to 8C, the bolt head 5 formed separately from the shaft 6 is composed of a shaft member in the form of a polygonal column to be fitted into the recess 6d, as shown in FIG. 9A. After the bolt head 5 composed of the shaft member is fitted into the recess 6d as shown in FIG. 9B, the bolt head 5 itself becomes the rupture portion 8. When rotational force is generated for example with a dedicated tool 9 attached to the bolt head 5 and acts on the bolt head 5, the shaft 6 rotates together with the bolt head 5 until torque acting on the rupture portion 8 becomes a predetermined value or more. When the torque acting on the rupture portion 8 becomes the predetermined value or more, the rupture portion 8 ruptures as shown in FIG. 9C. Thus, in the modification of FIGS. 9A to 9C, if the bolt head 5 is made of a material having a high resistance to corrosion, for example, the shaft 6 does not start to corrode from a rupture surface formed after rupture of the rupture portion 8. Even if the bolt head 5 is made of steel, coating having a resistance to corrosion may be applied in advance on the recess 6d of the shaft 6, for example. In doing so, even if corrosion starts to develop from the rupture surface after rupture of the rupture portion 8, the corrosion will not reach as far as the shaft 6.

The structure of the anchors shown in FIGS. 8A to 8C and 9A to 9C may be installed by the same method as that described in the aforementioned preferred embodiment.

What is claimed is:

1. An anchor, comprising:
an anchor bolt having a shaft comprised of a first shaft part and a second shaft part, the second shaft part being coaxial with said first shaft part and smaller in diameter than said first shaft part, a step is formed between said first shaft part and said second shaft part, the second shaft part is provided with a male screw thread, and a bolt head is provided at the first shaft part and a tip portion is provided at the second shaft part;

a spreading sleeve having a tubular body and spreading parts provided at a tip portion of the tubular body, the spreading sleeve being capable of being fitted on the tip portion of said shaft so as to receive the tip portion of the shaft therein, the spreading parts being formed by a longitudinally cut slot so as to spread outwardly; and a cone nut provided at its inner side with a threaded hole to threadedly engage with said male screw thread formed on said shaft, the cone nut having an outer diameter that gradually increases in the axial direction of said threaded hole from a first end of the cone nut to a second end of the cone nut, the cone nut being attached to the tip portion of said shaft while the first end of the cone nut is fitted in the tip portion of said spreading sleeve, wherein said first shaft part is provided with a rupture portion, the rupture portion being provided at a position spaced by a predetermined length from said step, the rupture portion rupturing if torque of a predetermined value or more acts on said bolt head, wherein the first shaft part includes a screw thread between the rupture portion and said step, said spreading sleeve can be fitted on said second shaft part of said shaft so as to receive said second shaft part therein, and when said shaft of said anchor bolt is inserted into a hole formed in a surface with the bolt head and a portion of the first shaft projecting from the surface and then rotated in response to rotation of said bolt head of said anchor bolt, said cone nut travels into said spreading sleeve, thereby making said spreading parts spread outwardly, and when torque of said predetermined value or more acts on said bolt head, said rupture portion ruptures to separate said bolt head from said first shaft which projects from the surface.

2. The anchor according to claim 1, wherein said anchor bolt is provided at the tip end of said second shaft part with a shaft center projection being a projecting part of a shaft center.

3. The anchor according to claim 2, wherein said shaft and said bolt head of said anchor bolt are formed separately, and said rupture portion is smaller in diameter than said shaft and is formed by fitting said bolt head into a polygonal recess provided at a base end portion of said shaft.

4. A method of installing the anchor as recited in claim 2, comprising:
    forming a fitting hole in a surface on which said anchor is to be installed, the fitting hole having a depth greater than a length of said second shaft part;
    inserting said anchor from its tip end portion into said fitting hole such that said first shaft part projects a predetermined length from the surface;
    making said cone nut travel into said spreading sleeve by rotating said bolt head, thereby making said spreading parts spread outwardly to make engagement between said spreading parts and the inner wall of said fitting hole; and
    rotating said bolt head by applying torque of said predetermined value or more to make said rupture portion rupture to separate said bolt head from said anchor.

5. The anchor according to claim 1, wherein said shaft and said bolt head of said anchor bolt are formed separately, and said rupture portion is smaller in diameter than said shaft and is formed by fitting said bolt head into a polygonal recess provided at a base end portion of said shaft.

6. A method of installing the anchor as recited in claim 1, comprising:
    forming a fitting hole in a surface on which said anchor is to be installed, the fitting hole having a depth greater than a length of said second shaft part;
    inserting said anchor from its tip end portion into said fitting hole such that said first shaft part projects a predetermined length from the surface;
    making said cone nut travel into said spreading sleeve by rotating said bolt head, thereby making said spreading parts spread outwardly to make engagement between said spreading parts and the inner wall of said fitting hole; and
    rotating said bolt head by applying torque of said predetermined value or more to make said rupture portion rupture to separate said bolt head from said anchor.

7. The anchor according to claim 1, wherein the threaded hole of the cone nut is a through hole.

8. The anchor according to claim 1, wherein the first end of the cone nut has a smaller diameter than the second end of the cone nut.

9. The anchor according to claim 1, wherein a step is formed between said first shaft part and said second shaft part, and when said shaft of said anchor bolt is inserted into the hole formed in the surface and rotated in response to rotation of said bolt head of said anchor bolt, the cone nut travels into said spreading sleeve contacting said step.

10. The anchor according to claim 1, further comprising a nut threaded on the screw thread of the first shaft part.

11. The anchor according to claim 1, wherein the first shaft part includes an attachment part between the rupture portion and the step.

* * * * *